No. 889,782. PATENTED JUNE 2, 1908.
S. W. HIGGINS.
SPRING WHEEL.
APPLICATION FILED MAY 31, 1907.
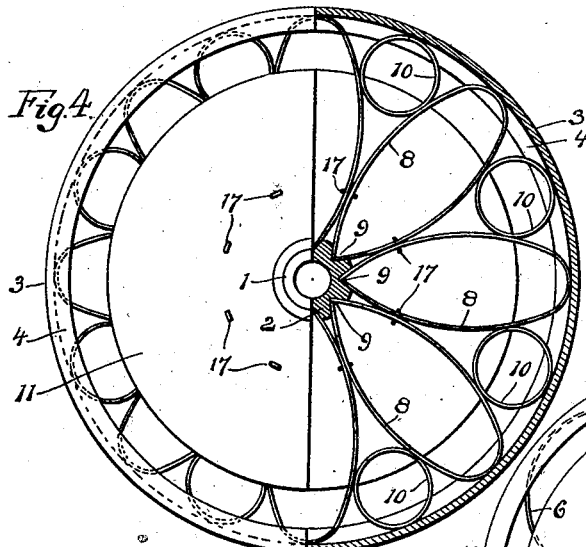
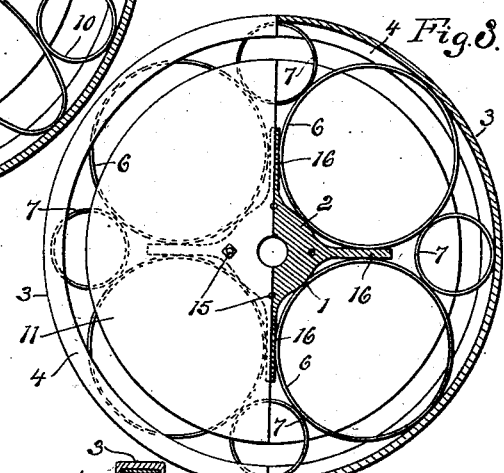
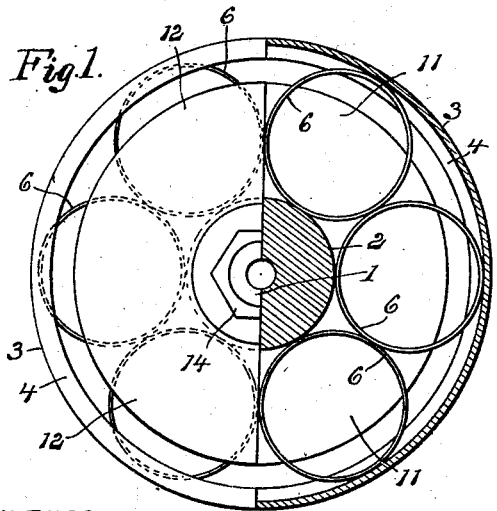
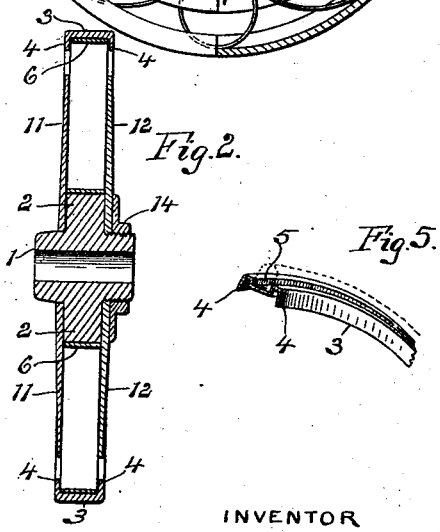
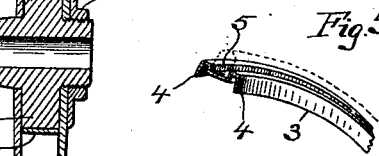
WITNESSES:
Anna M. Dorr.
Anna M. Mayer.
INVENTOR
Sylvester W. Higgins
By Barthel & Barthel
Attorneys.

UNITED STATES PATENT OFFICE.

SYLVESTER W. HIGGINS, OF DETROIT, MICHIGAN, ASSIGNOR OF ONE-HALF TO FRANK H. FARNSWORTH, OF DETROIT, MICHIGAN.

SPRING-WHEEL.

No. 889,782.   Specification of Letters Patent.   Patented June 2, 1908.

Application filed May 31, 1907. Serial No. 376,491.

*To all whom it may concern:*

Be it known that I, SYLVESTER W. HIGGINS, a citizen of the United States of America, residing at Detroit, in the county of Wayne and State of Michigan, have invented certain new and useful Improvements in Spring-Wheels, of which the following is a specification, reference being had therein to the accompanying drawings.

This invention relates to vehicle wheels and especially to the type wherein resilient members are interposed between the hub and rim to maintain them in yielding relation. In wheels of this class it is customary to secure the resilient members rigidly to the hub and rim.

One of the features of this invention is a frictional engagement between the parts which permits free oscillation while it obviates the necessity of rigidly bolting or otherwise fastening the spring members to the hub and rim.

The invention consists in the matters hereinafter set forth, and more particularly pointed out in the appended claims.

Referring to the drawing, Figure 1 is a view in side elevation, with parts removed or broken away, of a wheel embodying the salient features of the invention. Fig. 2 is a view in cross-section through the wheel; Fig. 3 is a view in side elevation, partly in section of an alternative form of construction; Fig. 4 is a similar view showing another arrangement of parts; and Fig. 5 is a view in section through a wheel rim.

In the drawings, 1 represents a wheel hub, adapted to be keyed or journaled on the shaft or axle of a vehicle. A central collar 2 is formed on the hub and a felly or rim 3 concentric with the collar forms the outer part of the wheel. Said rim is preferably an annular channel bar with inturned slightly flared flanges 4, provided, if desired, with a groove 5 in its periphery for retaining a resilient tire, or the rim may itself form the tread.

A plurality of symmetrically disposed closed spring loops of flat, spring metal bars, are interposed between the rim and hub in close pressed, contacted relation with each other and the rim and hub. These may comprise a number of circular members 6 in tangential contact with the periphery of the hub and the inner face of the rim between the flanges 4, which prevent lateral displacement. Or some of the circular spring members 6 may touch both the rim and hub, while auxiliary circular members 7, of less diameter, may be interposed when desired to support the rim between the larger members. Another desirable form of springs, consists in a plurality of elliptical loops 8 with their major axes radially disposed, the outer curved ends pressing against the inner face of the rim and their adjacent sides in contact for a portion of their length. The inner ends 9 of the elliptical members are preferably wedge-shaped and fit into corresponding recesses in the periphery of the collar of the hub. Small circular springs 10 are interposed between the rim and the divergent outer portions of the ellipses beyond their contacting points. It is to be understood that all of these spring members are normally in compression between each other and the retaining hub and rim, and are preferably not riveted or bolted to each other or to the rim.

To retain the spring members on the hub collar against lateral displacement, as well as transmit torsional strains between the hub and rim, a pair of flanges are secured on the hub on either side of the collar. One of these flanges as 11 may be permanently secured to or made fast on the hub, and the other 12 may be screwed home and held by a jam-nut 14, or by bolts 15 passing through the flange and central hub. These flanges are so proportioned as to extend a major portion of the way toward the wheel rim, thereby effectively preventing dishing of the wheel from side strain or thrust. Furthermore, when the wheel is for traction use, the flanges may be adjusted to frictionally engage the edges of the spring members with sufficient force so that the multiple effect of the grip of the flanges on all the spring members is sufficient to transmit torsional strain from the hub to the rim, the flaring flanges of the latter likewise being so disposed that the springs partially wedge themselves into them. At the same time, since the load is usually distributed on the spring members in approximately vertical lines through the hub, and is therefore localized, it readily moves these parts against their local frictional engagement, thus not affecting the resiliency of the wheel materially and aiding in absorbing the recoil.

When the wheel is to be used for traction purposes as well as a bearing wheel, it is desirable to furnish suitably disposed radial ribs or arms 16 lying between the spring members. These arms may be formed integrally with the hub or one of the flanges.

When the elongated or ellipsoidal springs are used, an equivalent of the ribs consist of a set of staples 17 loosely encircling the contacting parts of the springs and engaging one or both of the flanges. Likewise, the inner wedge-shaped ends of the ellipses may be rigidly attached to the hub collar by any suitable means.

Obviously the design and arrangement of parts may be varied without departing from the spirit of the invention and I do not care to limit myself to any particular form or arrangement of parts save as set forth in certain of the claims.

What I claim as my invention is:—

1. A vehicle wheel comprising a hub, a rim normally concentric with the hub, having inturned marginal flanges, a plurality of closed spring metal loops interposed between the hub and rim, in close-pressed contact with each other and the hub and rim, and a pair of parallel flanges adjustably secured on the hub on each side of the springs adapted to frictionally engage the edges of the springs for a major portion of their extent.

2. A vehicle wheel comprising a hub, a rim normally concentric with the hub, having inturned marginal flanges, a plurality of closed loops of flat-spring metal, interposed between the hub and rim, in close-pressed tangential contact with each other and the hub and the rim, and a pair of flanges secured on the hub adapted to frictionally engage the edges of the springs for a major portion of their extent.

3. A vehicle wheel comprising a hub, provided with a central collar and parallel retaining flanges on either side of the collar, a rim normally concentric with the collar having inturned flaring marginal flanges, and a plurality of closed spring loops held in compression between the collar and inner periphery of the rim in close contact with each other, said springs having wedged frictional engagement with the rim flanges, and frictional sliding engagement for a greater portion of their extent with the hub flanges.

4. A vehicle wheel comprising a hub, provided with a central collar and parallel retaining flanges on either side of the collar, a rim normally concentric with the collar having inturned flaring marginal flanges, and a plurality of closed loops of flat spring metal held in compression between the collar and inner periphery of the rim in close contact with each other, said loops having independent frictional engagement with the flaring rim flanges and frictional sliding engagement for a greater portion of their extent with said hub flanges.

5. A vehicle wheel comprising a hub, provided with a central collar and parallel retaining flanges on either side of the collar, a rim normally concentric with the collar, having inturned flaring marginal flanges, a plurality of closed loops of flat spring metal, held in compression between the collar and inner periphery of the rim in close contact with each other, said loops having independent, marginal wedging frictional engagement with the flaring rim and frictional sliding engagement for a greater portion of their extent with said hub flanges, and means to adjustably secure said hub flanges in such frictional engagement.

6. A vehicle wheel comprising a hub, a rim normally concentric with the hub having inturned, marginal flanges, a plurality of closed spring metal loops interposed between the hub and rim in close-pressed contact with each other and the hub and rim, a pair of parallel flanges adjustably secured on the hub on each side of the springs, adapted to frictionally engage the edges of the springs for a major portion of their extent, and a plurality of stops limiting the movement of the spring loops around the hubs.

7. A vehicle wheel comprising a hub, a rim normally concentric with the hub, having inturned marginal flanges, a plurality of closed loops of flat spring metal interposed between the hub and rim in close-pressed contact with each other and the hub and the rim, a pair of flanges secured on the hub adapted to frictionally engage the edges of the springs for a major portion of their extent and a plurality of stops limiting the movement of the spring loops around the hubs.

8. A vehicle wheel comprising a hub, a rim normally concentric with the hub, having inturned marginal flanges, a plurality of closed loops of flat spring metal interposed between the hub and rim, in close-pressed tangential contact with each other and the hub and the rim, a pair of flanges secured on the hub adapted to frictionally engage the edges of the springs for a major portion of their extent and a plurality of radially disposed stops interposed between some of the loops limiting their movement around the hub.

9. A vehicle wheel comprising a hub having a centrally indented periphery, a rim concentric with the indented portion of the hub, provided with inturned flaring flanges, a plurality of ellipsoidal loops of spring metal with their major axes radially disposed, and their inner ends adapted to engage the indentations in the hub, in compression between the hub and rim and each other, a plurality of closed circular loops in compression between the outer portions of the ellipsoidal loops and rim, and a pair of flanges on the hub adapted to frictionally engage the edges of the spring loops for a major portion of their extent.

10. A vehicle wheel comprising a hub, having a centrally indented periphery, a rim concentric with the hub provided with inturned flaring flanges, a plurality of ellipsoidal loops of flat spring metal, with their major axes radially disposed, and their inner ends adapted to engage the indentations in the hub, in compression between the hub and rim and each other, a plurality of closed circular loops of flat spring metal in compression between the outer portions of the ellipsoidal loops and rim, and a pair of flanges on the hub adapted to frictionally engage the edges of the spring loops for a major portion of their extent.

11. A vehicle wheel comprising a hub having a centrally indented periphery, a rim concentric with the indented portion of the hub, provided with inturned flanges, a plurality of ellipsoidal loops of spring metal, with their major axes radially disposed and their inner ends adapted to engage the indentations in the hub, in compression between the hub and rim and each other, a plurality of closed circular loops of flat spring metal in compression between the outer portions of the ellipsoidal loops and rim, a pair of flanges on the hub, adapted to frictionally engage the edges of the spring loops for a major portion of their extent and stops limiting the movement of the ellipsoidal loops around the hub.

12. A vehicle wheel comprising a hub, having a centrally indented periphery, a rim concentric with the indented portion of the hub, provided with inturned flaring flanges, a plurality of ellipsoidal loops of flat spring metal, with their major axes radially disposed, and their inner ends adapted to engage the indentations in the hub, in compression between the hub and rim and each other, a plurality of closed circular loops of flat spring metal in compression between the outer portions of the ellipsoidal loops and rim, a pair of flanges on the hub, adapted to frictionally engage the edges of the spring loops for a major portion of their extent and radially disposed stops secured to the hub interposed between the ellipsoidal loops limiting their movement around the hub.

In testimony whereof I affix my signature in presence of two witnesses.

SYLVESTER W. HIGGINS.

Witnesses:
OTTO F. BARTHEL,
ETHEL M. HIGGINS.